2,773,100

PREPARATION OF 2,2'-METHYLENE-BIS-4,6-DIALKYL PHENOLS

Hugh Wendell Stewart, Plainfield, N. J., assignor to American Cyanamid Company, New York, N. Y., a corporation of Maine No Drawing. Application December 30, 1955, Serial No. 556,455

3 Claims. (Cl. 260—619)

This invention is concerned with antioxidants. More particularly, it is concerned with 2,2'-methylene-bis-4,6-dialkyl phenols useful as rubber antioxidants. Still more particularly, it is concerned with a new and improved method of preparing 2,2'-methylene-bis-4,6-dialkyl phenols.

In the commercial manufacture of various products, it is necessary to include in the formulation materials which render the whole resistant to deterioration by the action of oxygen. An excellent illustration is the compounding and vulcanization of rubber. Vulcanized products quickly develop altered properties on exposure to oxygen. The rate of deterioration, of course, is dependent upon the oxygen content of the atmosphere in which they are exposed, as well as the temperature, pressure, the presence or absence of sunlight, and the like.

In the manufacture of vulcanized rubber products, various chemical compounds have been employed as antioxidants. Among those which have been found to be particularly outstanding is the class of 2,2'-methylene-bis-4,6-dialkyl phenols, especially those which may be represented by the formula

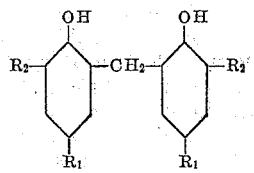

in which $R_1$ is a straight-chain alkyl radical of from 1 to 3 carbon atoms and $R_2$ is a tertiary alkyl radical of from 4 to 8 carbon atoms.

One method of preparing this class of compounds comprises reacting the corresponding dialkyl phenol with formaldehyde in the presence of an organic solvent, for instance, heptane, and an acidic catalyst such as sulfuric acid. A more successful procedure, however, is one in which the corresponding dialkyl phenol is reacted with formaldehyde in the presence of an acid catalyst in an aqueous medium. It has also been proposed to add to the aqueous medium a small amount of an organic solvent whereby the purity, color and physical form of the product are improved. When conducting the condensation in an aqueous medium, it is highly desirable to include therein an anionic surface active agent to disperse the phenol. After the reaction is completed at an elevated temperature, the reaction mass is cooled and the solid crystalline product separated, washed and dried.

The advantages of such a procedure are numerous. For instance, it is capable of giving a product of high purity. It is also capable of such control as to permit separation of a crystalline product rather than agglomerates. Particularly advantageous are the greatly increased production capacity obtained by use of water as a reaction medium rather than an organic solvent and the absence of a recovery system so essential when employing large volumes of organic solvents.

It has also been demonstrated that an excellent yield of product can be obtained in an aqueous medium using an anionic surface active agent. Separation of the product from the reaction mass raises another problem, however. In general, the recovery of product is considerably lower than the actual yield resulting from the condensation reaction. This appears to occur because some of the product remains suspended or emulsified as very fine crystals. Not only is this emulsified material impossible to separate thereby resulting in a loss of product, but its presence also slows down the separation procedure particularly when filtration is practiced, thereby placing an extra burden on equipment and operators. This problem, moreover, is considerably aggravated when conducting the process on a commercial rather than laboratory scale.

There has remained, therefore, a very definite need for a means for modifying the above-described otherwise successful procedure whereby a high recovery of product may be obtained, particularly when the process is conducted in a commercial size installation. It is an object of this invention to provide an improvement which successfully fulfills this need. It is a further object of this invention to provide such an improvement without adversely affecting the already existing advantages of conducting the condensation of a phenol and formaldehyde in aqueous medium using an anionic agent.

Surprisingly, it has now been found, in accordance with the improvement comprising the process of this invention, that the recovery of the condensation product obtained by the above-described procedure can be increased in a manner which is quite simple, yet unexpectedly effective. This improvement comprises the addition to the reaction mixture, after the condensation reaction is substantially complete, an effective amount of a cationic surface active agent. The result is the agglomeration of the fine particles into agglomerates large enough to be separated and to permit fast separation. Treatment of the modified reaction mixture to recover the product may then be conducted with unusual ease and a recovery of product heretofore unrealized.

Any of the numerous types of cationic surface active agents or mixtures thereof may be readily employed in the process of this invention. Illustrative thereof are the cationic agents classified as amine salts such as the alkylol-substituted alkyl guanidine salts described in United States Patent No. 2,574,510, particularly Aerosol C-661, a mixture of octadecyl amide and octadecylguanidine salts of octadecyl carbamic acid reacted with ethylene oxide, and the alkaterage type such as those described in United States Patent No. 2,402,791; those classified as quaternary ammonium compounds such as those described in United States Patent No. 2,589,647, particularly Aerosol SE, a 50% solution of stearamidopropyl dimethyl-beta-hydroxyethyl ammonium chloride, and Cationic SP, a stearamidopropyl dimethyl-beta-hydroxyethyl ammonium dihydrogen phosphate as a 35% solution in an isopropyl-water mixture; and the like.

The amount of cationic agent employed, naturally, is that effective to obtain the desired result. This amount may best be defined numerically by reference to the amount of anionic agent employed. Thus it has been found that as little as 0.3 parts by weight of the cationic agent per 1 part of anionic agent provides marked increase in the recovery of product and improved ease in separation. This amount may be considerably increased, but results are not improved proportionately. More than about 3 parts of cationic agent to 1 part of anionic agent is unnecessary and might even result in further dispersion of the product. The preferred range for optimum results is about 1.0–2.5 parts of cationic agent to 1 part of anionic agent. The actual amount employed may be influenced to some extent, however, by the particular agent employed as well as by the particular product prepared.

With respect to the condensation reaction itself, there are various operating restrictions which should be observed for optimum results. For instance, although the water serves only as a reaction medium and not as a solvent for the dialkyl phenol, the amount of water employed should be controlled within certain limits. At least sufficient water should be provided to avoid formation of an unmanageable mass and allow for agitation. It has been found that at least about 150 ml./mol of dialkyl phenol should be employed to permit adequate agitation during reaction. Preferably, the amount should be 500 ml. per mol of dialkyl phenol and may be considerably more.

Various acid catalysts may be employed, but, in general, the catalyst will be either sulfuric or phosphoric acid. These will be employed in varied amounts depending upon the acid strength. For instance, when using 98% sulfuric acid, the amount of acid may vary from about 2 grams to about 20 grams/l. of water. Less than about 2 grams, however, is inadequate and results in a substantial lowering of the yield. On the other hand, more than about 10 grams results in no added advantage. A preferred range of 98% sulfuric acid is about 6–10 grams/l. of water.

As previously stated, the condensation reaction requires the use of an anionic dispersing agent for the dialkyl phenol. Such dispersing agent must be one which is not subject to hydrolysis or is otherwise affected in acidic aqueous solutions. Among those compounds which have been found to be particularly suitable are sodium alkyl benzene sulfonates in which the aliphatic side chain contains at least 10 carbon atoms, preferably 10–12 carbon atoms, for example, sodium dodecyl benzene sulfonate, and sodium dialkyl naphthalene sulfonates in which the two aliphatic side chains contain at least 5 carbon atoms, for example, sodium diamyl naphthalene sulfonate. These classes of compounds have been found to successfully disperse the dialkyl phenol in such a form that it will readily condense with the formaldehyde. The amount of dispersing agent employed may vary quite widely and will depend to some extent on the particular dispersing agent employed. In general, however, it has been found that from about 0.5 to about 1.5 grams real of dispersing agent per mol of dialkyl phenol gives good results. While lesser or greater amounts may be employed, if desired, it has been found that the required dispersion is not obtained with lesser amounts while greater amounts show no added advantage.

The condensation is preferably conducted by adding, with agitation, the formaldehyde to a mixture of dialkyl phenol, acid catalyst, dispersing agent, and water, preferably at an elevated temperature, over an extended period of time. After addition of the formaldehyde is complete, agitation is continued until reaction is substantially complete. It is also preferable, but not necessary, to have present from 1–3% of an organic solvent by weight of the reaction mixture in the aqueous medium.

After completion of the reaction at a temperature usually not exceeding about 95° C., sodium hydroxide or other suitable neutralizing agent may be introduced and the contents cooled. The reaction mass may then be centrifuged, filtered, or otherwise treated to effect a separation of the solid product. The separated product is then washed with water and dried.

The addition of the cationic agent of this invention may be made at any of various times, but should be at least after the condensation reaction is substantially complete. It may be made before or after cooling of the reaction mixture, or even during the actual separation. Best results have been observed to occur, however, if the addition is made before cooling.

The following examples further describe the invention. These are illustrative only and not intended to be restrictive. All parts are by weight unless otherwise noted.

*Example 1*

To 4200 parts of water containing 30 parts Ultra-wet 30 DS containing 7.8 parts of sodium dodecyl benzene sulfonate, 29 parts of 98% sulfuric acid, 15 parts Versenol and 10 parts polyvinyl alcohol there is added 1275 parts of 2-tertiarybutyl-4-methylphenol. The mixture is then heated to 90° C. and 175 parts of 37% Formalin added in 10 minutes. A temperature of 90°–95° C. is maintained and after one hour an additional 190 parts of 37% Formalin is added over a period of one hour. After an additional 2 hours, 12 parts of Aerosol C–61 containing an ethenolated alkyl guanidine amine complex is added. The reaction mixture is cooled to 80° C., neutralized with 50% sodium hydroxide and 100 parts sodium bisulfite added. After adding 0.1 part Dow-Corning Antifoam AF emulsion, the mixture is cooled to 35° C. and isolated by filtration, washed with water and dried. A yield of 1250 parts (95% yield) of 2,2'-methylene-bis (4-methyl - 6 - tertiarybutylphenol) is obtained.

*Example 2*

The procedure of Example 1 is repeated except that 1275 parts of 2-tertiarybutyl-4-ethylphenol is substituted for the 2-tertiarybutyl-4-methylphenol. 1250 parts (95% yield) of 2,2'-methylene-bis (4-ethyl-6-tertiarybutylphenol) is obtained.

*Example 3*

The procedure of Example 1 is followed except that 8 parts real of stearamidopropyl dimethyl-beta-hydroxyethyl ammonium chloride (Aerosol SE) is used in place of the Aerosol C–61. On filtration, a similar yield of product is obtained with no difficulties experienced in the separation.

*Example 4*

The procedure of Example 2 is followed except that 8 parts real of an amine condensation product with ethylene oxide (ethomeen C–15) is used in place of the Aerosol C–61. Again, similar results are obtained.

While certain cationic agents are illustrated by the examples, it should be understood that any of the various types of cationic agents as previously discussed may be readily employed to obtain similar results. Similarly, the dialkylphenol may be varied as discussed.

The following examples further illustrate the advantages of this invention.

*Example 5*

The procedure of Example 1 is repeated except the cationic agent, Aerosol C–61, is not added after the reaction is complete. The mixture is cooled and filtered and the product washed and dried. 1175 parts of product is obtained representing a yield of 89%. Filtration is difficult and time consuming.

*Example 6*

The procedure of Example 2 is repeated except that the addition of the cationic agent, Aerosol C–61, is omitted. As in Example 5, filtration is difficult and time consuming. 1175 parts of product is obtained representing a yield of 89%.

I claim:

1. In the process of preparing a 2,2'-methylene-bis-4,6-dialkyl phenol of the formula

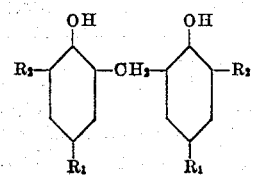

wherein $R_1$ is an alkyl radical of 1–3 carbon atoms and $R_2$ is a tertiary alkyl radical of 4–8 carbon atoms which comprises reacting the corresponding dialkyl phenol with formaldehyde in an aqueous medium in the presence of an acid catalyst and an anionic dispersing agent followed by treatment of the reaction mass to separate 2,2'-methylene-bis-4,6-dialkyl phenol, the improvement in combination therewith which comprises: adding to said reaction mass after the reaction is substantially complete a cationic surface active agent in an amount such as to agglomerate the particles of 2,2'-methylene-bis-4,6-dialkyl phenol and subjecting the reaction mass to filtration.

2. A process according to claim 1 in which the amount of cationic agent added is about 0.3–3.0 parts by weight per each part of anionic agent employed in the condensation reaction.

3. A process according to claim 2 in which the addition of cationic agent is about 1.0–2.5 parts by weight per each part of anionic agent employed.

References Cited in the file of this patent

UNITED STATES PATENTS

| | | |
|---|---|---|
| 2,330,217 | Hunn | Sept. 28, 1943 |
| 2,538,355 | Davis et al. | Jan. 16, 1951 |

FOREIGN PATENTS

| | | |
|---|---|---|
| 711,122 | Great Britain | June 23, 1954 |